United States Patent Office 3,574,524
Patented Apr. 13, 1971

3,574,524
COMPOSITIONS USEFUL FOR CLEANING ARTICLES COMPOSED OF POLYESTER AND CELLULOSIC FIBERS
Julian J. Hirshfeld, Decatur, Ala., assignor to Monsanto Company
No Drawing. Filed May 12, 1967, Ser. No. 637,902
Int. Cl. B08b 3/00
U.S. Cl. 8—137                                  6 Claims

ABSTRACT OF THE DISCLOSURE

This invention relates to a novel composition useful for washing an article composed of polyester and cellulosic fiber, the composition comprised of a synthetic detergent selected from the group consisting of anionic, nonionic and/or amphoteric surface active compounds, an organic builder selected from the group consisting of amino lower alkylidenephosphonic acids and their water soluble salts and a polyester-fiber swelling agent. Also, the invention relates to a novel method of washing such an article with the above composition.

BACKGROUND OF THE INVENTION

Polyester fibers in blends with cellulosic fibers soil very readily, tenaciously holding the soil onto the fiber. Van der Waal's forces, static forces and other similar type forces or means are thought to be responsible for the generally increased soiling. Also, a factor of no minor influence is the fabric construction, i.e. a twill construction is more difficult to clean than a plain weave fabric. Although many of the synthetic detergents show a limited cleansing action, they can not efficiently and satisfactorily clean heavily soiled fabrics and in some cases, especially at the inside collar area of shirts, are not effective to remove soil and body oils.

It was found that by adding a polyester-fiber swelling agent to a composition containing a synthetic detergent and an organic builder, i.e. amino lower alkylidenephosphonic acids and their water soluble salts, that fabrics composed of polyester and cellulosic fibers could be more readily and efficiently cleansed. As used herein, the term "builder" means a substance used with or in a detergent composition to aid in cleansing.

The use of builders in detergents is today of common practice. For example, polyphosphates such as sodium tripolyphosphate and tetrasodium pyrophosphate are useful and, when used in moderate amounts, a synergistic effect on relatively low percentages of the surface active compounds is realized. However, the susceptibility of these polyphosphates to hydrolyze or degrade in aqueous solutions is well known, being primarily dependent on pH and temperature conditions. This invention however teaches builders which are "hydrolytically stable" and have comparable properties to the polyphosphates but which do not exhibit the disadvantages of the polyphosphates.

The compositions of this invention are suitable for many purposes. Among such being powder detergents and liquid detergents, both of which require a relatively long shelf life to remain stable under various storage conditions. Also, the compositions of this invention are useful for improved handling and storage characteristics, especially when the detergent is in an aqueous solution ready for use. Higher temperatures can also be used with the compositions of this invention since the organic builders are "hydrolytically stable," for example in processing dry detergents where a spray-drying operation is employed.

DESCRIPTION OF THE INVENTION

It is therefore an object of this invention to provide a novel composition useful for cleaning articles composed of polyester and cellulosic fibers.

Another object of this invention is to provide a novel method of cleaning articles composed of polyester and cellulosic fibers.

Still further, it is an object of this invention to provide a novel composition and method for cleaning articles composed of polyester and cellulosic fibers, the composition containing therein a polyester-fiber swelling agent, a "hydrolytically stable" organic builder and a synthetic detergent.

Other objects of this invention will become apparent as the invention is fully developed within the specification and the claims.

These and other objects of this invention are accomplished by providing a composition useful for washing an article composed of polyester and cellulosic fibers, the composition comprising a synthetic detergent selected from the group consisting of anionic, nonionic, and/or amphoteric surface active compounds, an organic builder selected from the group consisting of amino lower alkylidenephosphonic acids and their water soluble salts and a polyester-fiber swelling agent. For example, a composition in an aqueous solution containing from about 0.01% to about 2% or more of a synthetic detergent, from about 0.01% to about 2% or more of the organic builder and from about 0.02% to about 4% or more of the polyester-fiber swelling agent, the percents based on weight of the solution, will clean the articles with good results. More preferably, the aqueous solution can contain from about 0.02% to about 0.5% of the synthetic detergent, from about 0.02% to about 0.3% of the organic builder and from about 0.05% to about 0.3% of the polyester-fiber swelling agent. It is preferred that the composition of this invention not constitute more than about 0.4% of the aqueous solution, this preference being based on economical reasons.

This invention is applicable with articles composed of polyester and cellulosic fibers. Polyester fiber is defined as a manufactured fiber in which the fiber-forming substance is any long-chain synthetic polymer composed of at least about 85% by weight of an ester of a dihydric alcohol and terephthalic acid or dimethyl terephthalate. Cellulosic fiber can be defined as cotton fiber, rayon fiber (a manufactured fiber composed of regenerated cellulose, as well as manufactured fibers composed of regenerated cellulose in which substituents have replaced not more than 15% of the hydrogens of the hydroxy groups) and acetate fiber (a manufactured fiber in which the fiber-forming substance is cellulose acetate; where not less than 92% of the hydroxyl groups are acetylated, the term triacetate may be used as a generic description of the fiber).

The synthetic detergents of this invention are defined as anionic, nonionic and/or amphoteric surface active compounds. Any of these synthetic detergents are useful with this invention as long as they are cleansing agents. The anionic surface active compounds can be broadly described as compounds containing hydrophilic and lyophilic in their molecular structure and which ionize in an aqueous medium to give anions containing the lyophilic group. Such compounds are usually the alkali metal salts of organic sulfonates or sulfates, particularly the sodium salts of alkyl aryl sulfonates (e.g. sodium dodecylbenzene sulfonate) and sulfates or straight chain primary alcohols (e.g. sodium lauryl sulfate). The nonionic surface active compounds can be broadly defined as compounds which do not ionize but which acquire hydrophilic characteristics from an oxygenated side chain, usually polyoxyethylene, where the lyophilic part of the molecule may come from fatty acids, phenols, alcohols, amides or amines. Examples of useful nonionic surface active compounds are the polyethylene oxide condensates of alkyl phenols (e.g. condensation product formed from 1 mole of nonyl phenol and 10 moles of ethylene oxide), and condensation products of aliphatic alcohols and ethylene oxide (e.g., condensation product formed from 1 mole of tridecanol and 12 moles of ethylene oxide). The amphoteric surface active compounds can be broadly described as compounds which have both anionic and cationic groups in the same molecule, e.g. sodium N-methyl taurate.

The polyester-fiber swelling agents useful with this invention can be any chemical agent which tends to swell or increase the peripheral area of a polyester fiber. Examples of useful agents include o-phenyl phenol, p-phenyl phenol, biphenyl, derivatives of biphenyl, monochlorobenzene, dichlorobenzene, trichlorobenzene, phenyl benzoate, butyl benzoate, salicylic acid and derivatives thereof, dimethyl terephthalate, aromatic esters, amyl phenol, wintergreen oil, pine oil, furfural, benzoic acid; thymol, b-naphthol, etc. Preferably the polyester-fiber swelling agents should be non toxic in nature. Biphenyl is preferred with this invention.

The organic builders useful with this invention are defined as amino lower alkylidene phosphonic acids and their water soluble salts. These builders are hydrolytically stable compounds. Said acids can be defined by the formula:

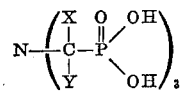

wherein X and Y represent hydrogen or a lower alkyl group (containing from 1 to about 10 carbon atoms). The water soluble salt of these acids are generally the alkali metal salts, such as potassium, sodium, lithium and mixtures of these metal salts. Also, any water-soluble salt, such as the ammonium salt and the amine salts which exhibit the characteristics of the alkali metal salt, are useful with the invention. Examples of the acids useful with this invention include amino tri(methylenephosphonic acid), amino tri(ethylidenephosphonic acid) and amino tri(isopropylidene phosphonic acid). The sodium salts of the amino lower alkylidenephoshponic acids, especially the penta sodium salt, are preferred.

Amino lower alkylidenephosphonic acids and their salts may be prepared by various means, one of which comprises as a first step the preparation of the corresponding ester by the following general reaction:

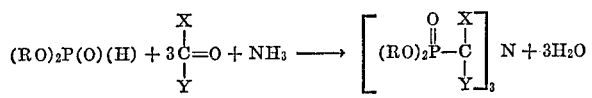

The free amino lower alkylidene phosphonic acids and their salts may be readily prepared by hydrolysis of the ester.

By the term "hydrolytically stable," as used herein, is meant a substantial resistance by the builder to hydrolysis or degradation under various pH and temperature conditions. For example, a 20 gram sample of penta sodium amino tri(methylenephosphonate),

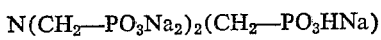

was dissolved in 100 ml. of water. A 25 ml. portion of the solution was added to a 25 ml. portion of 12 normal HCl to give a 10% solution of the builder in HCl. Another 25 ml. portion of the solution was added to a 25 ml. portion of 10% NaOH to give a 10% solution of the builder in a 5% solution of NaOH. The foregoing 10% solutions were boiled for a period of four hours, at the end of which both solutions exhibited no change in physical properties. Nuclear magnetic resonance spectra showed the two 10% solutions to be identical with a fresh 10% solution of the builder in water, thereby establishing the resistance of the builder to hydrolysis or degradation under severe temperature and pH conditions. It should be noted that all known polyphosphates, whether in the acid, salt or ester form, would hydrolyze or degrade completely under the foregoing conditions. Another sample, in this instance 2 grams of the anhydrous penta sodium amino tri(methylenephosphonate), dry powder, was heated on a thermogravimetric balance—below a temperature of 300° C., less than 1% weight loss resulted. X-ray diffraction patterns of the heated sample and an unheated sample were identical. As is readily ascertainable from the foregoing, the organic builder of the instant invention is "hydrolytically stable" and, by exhibiting building properties comparable to the polyphosphates, can be used advantageously in various detergent building applications.

Since most of the synthetic detergent compositions are used in alkaline aqueous systems, the amino lower alkylidenephosphonic acids may be used by adjusting the PH, if required, of the detergent composition or the resulting aqueous solution to the desired alkaline pH condition. In view of the foregoing, it is preferred that the pH of the composition or the aqueous composition of this invention be such as to result in an aqueous washing solution having at least a pH of 9 or above when the detergent composition is used in amounts to give effective cleansing action.

It has been found that penta sodium amino tri(methylenephosphonate) hexahydrate particles are nonhygroscopic and free flowing and, therefore, exhibit improved handling properties which make them especially suited for use as a builder and with the composition of this invention. The hexahydrate penta sodium salt may readily be prepared by humidifying the anhydrous salt form under about 30-90% Relative Humidity and room temperature conditions for about 30 minutes. The anhydrous penta sodium amino tri(methylenephosphonate) may readily be prepared by dissolving the acid form in an aqueous solution containing a stoichiometric amount of NaOH, evaporating and drying at about 120° C.

The amount of organic builder necessary to be used with the synthetic detergent (surface active compound) and the polyester-fiber swelling agent may vary depending upon, inter alia, the end use, type of service employed and pH conditions. It should also be noted that the builder of the instant invention may be used in conjunction with the conventional polyphosphate builders. It has been found that a builder containing a weight ratio of sodium tripolyphosphate and penta sodium amino tri(methylenephosphonate) within 1:10 and 10:1 in some instances functions better as a builder than either when used individually. The organic builders can be employed with the detergent and swelling agent in any desired proportions. The optimum detergent/builder ratio depends upon the particular active (i.e. detergent or surface active compound) employed and the end use for which is intended, but most generally will fall within the range of a detergent/builder weight ratio 4:1 to 1:4, which is, therefore, the preferred range to practice the invention. The amount of polyester-fiber swelling agent employed with the active/builder combination depends upon the article to be washed, e.g. a higher percentage is preferred where the article contains a higher percentage of polyester fiber; generally from about 10% to about 100% or even up to 500% of swelling agent, based on weight of the active/builder combination, is useful to give good results.

The compositions of the present invention are generally effective when used in aqueous systems in conventional amounts such as is normally used with detergent compositions containing known surface active compounds and builders (e.g., polyphosphates) and which is generally about .4% concentration or below.

While the organic builders of this invention compare favorably with conventional polyphosphates, it is appreciated that the builders of this invention are especially suitable in compositions wherein a hydrolytically stable builder is required. Further, the penta sodium salt of amino tri(methylenephosphonic acid) exhibits a markedly greater solubility in water than either sodium tripolyphosphate or tetrasodium pyrophosphate. For example, at room temperature penta sodium amino tri(methylenephosphonate) is soluble in water to the extent of 44%, whereas sodium tripolyphosphate is soluble to the extent of 13% and tetrasodium pyrophosphate is soluble to the extent of 16%. As can be readily ascertained the penta sodium salt exhibits good water solubility and is extremely suitable for use in liquid detergents.

The invention is not to be limited to any particular method of mixing the organic builder, the swelling agent and the detergent. The builder and swelling agent may be mechanically mixed in, suspended in the detergent in the form of a slurry, or dissolved in a solution of the detergent. In addition, the builder and swelling agent may be admixed with the detergent in any of the forms in which the detergent is manufactured, as well as being added simultaneously or separately to aqueous solutions.

The following examples are presented to illustrate specific working embodiments of the invention. Where percents are used, they are based on weight unless otherwise specified.

EXAMPLE 1

Samples of twill fabric, composed of 50/50 polyester/cotton fibers, are soiled by the Spangler's Soiling Procedure (described in "The Journal of The Americal Oil Chemists' Society," August 1965, vol. 42, No. 8, pp. 723–726) and are then washed for 15 minutes at 150° F. in aqueous solutions containing the below indicated compositions. After washing, the samples are rinsed thoroughly with hot and cold water and dried at 180° F. Thereafter the percent change in reflectance of the sample, i.e. the change in reflectance before soiling and after washing, is determined and is reported in Table I. The reflectance of the samples is determined by using a Photovolt Reflectance Meter (Model No. 610; Photovolt Corp., New York City, N.Y) having a green tristimulus filter. The "Percent change in Reflectance," being a measure of the cleansing action of the composition to remove the soil from the sample is determined by the following formula:

Percent change in reflectance $$= \frac{\text{original reflectance} - \text{final reflectance}}{\text{original reflectance}} \times 100$$

wherein:

Original reflectance = reflectance of the sample before soiling
Final reflectance = reflectance of the sample after it is washed A smaller "percent change in reflectance" indicates a better result, i.e. a composition indicating such a change is the most effective composition to clean the article.

TABLE I

| Sample | Composition of aqueous solution | Percent change in reflectance |
| --- | --- | --- |
| a | 5 g./l. of an anionic surfactant | 34 |
| b | 5 g./l. of a nonionic surfactant which is, viz, nonylphenoxypoly (ethyleneoxy) ethanol. | 51 |
| c | 5 g./l. of an alkylphenoxypoly (ethyleneoxy) ethanol, 1 g./l. of penta sodium amino tri (methylene). | 33 |
| d | 2 g./l. of Varsol (petroleum ether drycleaning fluid, 1 g./l. of an alkyl phenoxy polyethoxy ethanol. | 43 |
| e | 5 g./l. of an anionic surfactant, 4 g./l. of biphenyl (polyester fiber swelling agent). | 37 |
| f | 5 g./l. of an alkylphenoxy poly (ethyleneoxy) ethanol, 4 g./l. of biphenyl, 1 g./l. of penta sodium amino tri (methylenephosphonate). | 17 |
| g | 5 g./l. of an alkylphenoxy poly (ethyleneoxy) ethanol, 4 g./l. of biphenyl. | 39 |

From these above data it is readily ascertainable that the composition containing the polyester fiber swelling agent (i.e. biphenyl), the synthetic surfactant and the organic builder (i.e. penta sodium amino tri (methylenephosphate) used to wash Sample f gives far superior washing results when compared to the solutions used to wash Samples c, e and g.

EXAMPLE 2

The procedure of Example 1 is repeated except the aqueous solution contains 5 g./l. of an anionic surfactant, 4 g./l. of o-phenyl phenol and 1 g./l. of amino tri (methylenephosphonic acid). The aqueous solution indicated a good cleansing action on the test sample.

As stated previously the compositions of this invention contain a synthetic detergent, an organic builder described as amino lower alkylidene-phosphonic acids and their water soluble salts and a polyester fiber swelling agent. It is to be assumed that the incoporation in these compopositions of additional ingredients conventionally used with cleansing agents, such as perfume, antiredeposition agents (e.g., carboxymethylcellulose) and brightening agents (e.g., fluorescent dyes), is contemplated as being within the realm of this invention.

What is claimed is:

1. A method of washing articles composed of polyester and cellulosic fibers comprising applying thereto an aqueous solution consisting essentially of:
   (1) from about 0.01 to about 2% of a synthetic detergent selected from the group consisting of anionic, nonionic and amphoteric surface active compounds,
   (2) from about 0.01 to about 2% of an organic builder having the general formula

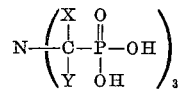

where X and Y are members selected from the group consisting of hydrogen and lower alkyl containing from 1 to about 10 carbon atoms, and
   (3) from about 0.02% to about 4% of an organic swelling agent, the percents based on weight of the aqueous solution, said organic swelling agent selected from the group consisting of monochlorobenzene, dichlorobenzene, trichlorobenzene, benzoic acid, phenyl benzoate, butyl benzoate, salicylic acid, o-phenyl phenol, amyl phenol, biphenyl, furfural and thymol.

2. The method of claim 1 wherein the organic builder is amino tri(methylenephosphonic acid).

3. The method of claim 1 wherein the organic builder is penta sodium amino tri(methylenephosphonate).

4. A method of washing articles composed of polyester and cellulosic fiber comprising applying thereto an aqueous solution consisting essentially of up to about 0.4% of a composition consisting of nonionic, anionic and amphoteric surface active compounds, an organic builder, said builder being hydrolytically stable and being defined by the general formula

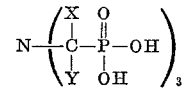

wherein X and Y represent hydrogen or an alkyl group containing from 1 to about 10 carbon atoms and a swelling agent selected from the group consisting of monochlorobenzene, dichlorobenzene, trichlorobenzene, benzoic acid, phenyl benzoate, butyl benzoate, salicylic acid, o-phenyl phenol, amyl phenol, biphenyl, furfural and thymol, the weight ratio of said synthetic detergent to said organic builder being within the range of from about 4:1 to about 1:4, respectively, and the swelling agent being from about 10% to about 500%, the percents being based on weight of the detergent/organic builder combination, of the composition.

5. The method of claim 4 wherein the organic builder is amino, tri(methylenephosphonic acid).

6. The method of claim 4 wherein the organic builder is penta sodium amino tri(methylenephosphonate).

References Cited
UNITED STATES PATENTS

| | | | |
|---|---|---|---|
| 2,221,933 | 11/1940 | Eitelman et al. | 252—143X |
| 2,955,905 | 10/1960 | Davies et al. | 8—137X |
| 3,203,753 | 8/1965 | Sherburne | 8—175X |
| 3,313,590 | 4/1967 | Delano et al. | 8—175X |
| 3,394,083 | 7/1968 | Yu Shen | 252—137X |

OTHER REFERENCES

Schwartz and Perry, "Surface Active Agents," vol. 1, 1949, p. 233.

Technicus, Textile Manufacturer, June 1945, pp. 256–257.

Hall, British Rayon & Silk Journal, August 1949, pp. 55–56.

Moncrief, "Man Made Fibres," Revised Impression 1966, pp. 367, 366, 369, 372–77, 385, 386.

Condensed Chemical Dictionary, 6th edition, p. 1226.

LEON D. ROSDOL, Primary Examiner

M. HALPERN, Assistant Examiner

U.S. Cl. X.R

252—152, 137; 8—130.1